United States Patent [19]

Hovestadt et al.

[11] Patent Number: 5,281,629

[45] Date of Patent: Jan. 25, 1994

[54] PROCESS FOR RECOVERING AND RECYCLING ORGANIC BINDER COMPONENTS FROM A COATINGS SLURRY

[75] Inventors: Wieland Hovestadt, Krefeld; Lothar Kahl, Bergisch-Gladbach; Juergen Meixner, Krefeld; Christian Wamprecht, Neuss; Volker Schneider, Wachtendonk; Manfred Schoenfelder, Leverkusen, all of Fed. Rep. of Germany

[73] Assignee: Bayer Aktiengesellschaft, Leverkusen, Fed. Rep. of Germany

[21] Appl. No.: 15,728

[22] Filed: Feb. 10, 1993

[30] Foreign Application Priority Data

Feb. 18, 1992 [DE] Fed. Rep. of Germany ....... 4204817

[51] Int. Cl.$^5$ ............................................. C08G 18/14
[52] U.S. Cl. .................................. 521/49; 521/49.5; 528/45; 528/49
[58] Field of Search .................. 521/49, 49.5; 528/45, 528/49

[56] References Cited

U.S. PATENT DOCUMENTS

| | | | |
|---|---|---|---|
| 4,220,456 | 9/1980 | Block | 55/85 |
| 4,629,477 | 12/1986 | Geke | 55/85 |

Primary Examiner—Maurice J. Welsh
Attorney, Agent, or Firm—Joseph C. Gil; Thomas W. Roy

[57] ABSTRACT

The present invention relates to a process for recovering and recycling the organic binder components accumulating during the spraying of a solvent-containing, two-component polyurethane coating or a solvent-containing, moisture-curing one-component polyurethane coating by i) forming a coatings slurry containing the organic binder components, water and a coagulating agent, ii) mixing the coatings slurry, optionally after removing a portion of the water, with an organic solvent which is inert towards isocyanate groups, iii) reacting the free isocyanate groups present in the mixture obtained in step (ii) with a compound containing one isocyanate-reactive group which is more reactive with isocyanate groups than both water and the isocyanate-reactive component of the two-component polyurethane coating, if present, and iv) removing any remaining water and insoluble components from the organic phase accumulating in step (iii) and recovering the organic phase containing the organic binder components.

9 Claims, No Drawings

PROCESS FOR RECOVERING AND RECYCLING ORGANIC BINDER COMPONENTS FROM A COATINGS SLURRY

BACKGROUND OF THE INVENTION

1. Field of the Invention

The invention relates to a process for the recovery and recycle of the organic binder components which accumulate during the spraying of one- or two-component, solvent-containing polyurethane coatings.

2. Description of the Prior Art

State of the art two-component, solvent-containing polyurethane coatings have gained great practical importance in the coatings sector because of their outstanding properties. In practice, the coatings are generally applied by spraying onto the substrate to be coated. In this process, the loss of significant amounts of the binder components used, due to "overspray," cannot by avoided. In practice, these excess amounts are generally washed out of the vent gases in the coating unit using water and coagulated by the joint application of coagulating agents, e.g., surface-active inorganic materials such as alumina. Previously, it has not been possible usefully to recycle this "coatings slurry."

Therefore, an object of the present invention is to develop a process for recovering and recycling the binder components present in the coatings slurry before they have become completely unusable due to the gradual and progressive cross-linking reaction. It is a further object of the present invention for the process to be also suitable for treating solvent-containing, one-component polyurethane coatings having binders based on moisture-hardening NCO prepolymers.

It has now been found that the organic binder components may be extracted from the fresh coatings slurry containing a) organic polyisocyanates b) (in the case of two-component polyurethane coatings) organic compounds with groups capable of reacting with isocyanate groups, preferably organic polyhydroxy compounds, c) optionally pigments and/or other auxiliaries and additives, d) coagulating agents and e) water, if the coatings slurry is initially introduced into an organic solvent and then reacted with compounds which are more reactive with isocyanate groups than both water and the reaction partner which contains isocyanate-reactive groups.

SUMMARY OF THE INVENTION

The present invention relates to a process for recovering and recycling the organic binder components accumulating during the spraying of a solvent-containing, two-component polyurethane coating or a solvent-containing, moisture-curing one-component polyurethane coating by i) forming a coatings slurry containing the organic binder components, water and a coagulating agent, ii) mixing the coatings slurry, optionally after removing a portion of the water, with an organic solvent which is inert towards isocyanate groups, iii) reacting the free isocyanate groups present in the mixture obtained in step (ii) with a compound containing one isocyanate-reactive group which is more reactive with isocyanate groups than both water and the isocyanate-reactive component of the two-component polyurethane coating, if present, and iv) removing any remaining water and insoluble components from the organic phase accumulating in step (iii) and recovering the organic phase containing the organic binder components.

DETAILED DESCRIPTION OF THE INVENTION

The process preferably serves for the recovery of the organic binder components which accumulate when working with two-component polyurethane coatings.

The polyisocyanate component in the two-component polyurethane coatings is preferably selected from the known coating polyisocyanates, i.e., derivatives of monomeric diisocyanates (preferably 1,6-diisocyanatohexane or mixtures of 1,6-diisocyanatohexane and 1-isocyanato-3,3,5-trimethyl-5-isocyanatomethylcyclohexane or, less preferably, aromatic diisocyanates such as 2,4- and/or 2,6-diisocyanatotoluene) which contain biuret, isocyanurate, urethane, allophanate and/or uretdione groups. These known surface coating polyisocyanates generally have a monomeric diisocyanate content of less than 0.5% by weight and an isocyanate group content of about 15 to 25% by weight.

The reaction partners for the isocyanate component of the two-component polyurethane coatings are preferably the known higher molecular polyhydroxyl compounds which have a hydroxyl group content of 0.1 to 10% by weight. Examples include polyesters, polyethers, polyacrylates, polyurethanes, polydiene resins and epoxide resins which have functional hydroxyl groups, and mixtures of these polyhydroxyl compounds.

The one-component polyurethane coatings, which are less preferred according to the invention, are those whose binders are based on NCO prepolymers which have an NCO content of about 3 to 16% by weight and are obtained by reacting the previously described monomeric diisocyanates or the polyisocyanate derivatives prepared therefrom with less than stoichiometric amounts of the previously described polyhydroxyl compounds.

Pigments, fillers and other additives such as flow-controllers, gloss-improvers, antisettling agents, thickeners, thixotropic agents, antioxidants, heat stabilizers, etc., may optionally be added to the original coatings, but have no effect on the process according to the invention. These components are found either in the organic phase which accumulates in accordance with process step (iv) or in the insoluble solid phase.

The coagulating agents used in the process according to the invention are substances which have a certain affinity with the organic components of the coatings and inhibit gumming, i.e., they prevent the coatings components sticking to the equipment and containers used. The use of coagulating agents in combination with water generally causes the formation of a multi-phase system in which the organic binder components present in the coatings coagulate or are absorbed on the coagulating agent. These solid components may be separated from the major portion of the water by flotation or sedimentation and removed continuously to form the coatings slurry isolated in process step (i).

Suitable coagulating agents include surface-active substances, e.g., metal oxides or hydroxides such as aluminium oxide or hydroxide and iron oxide, oxide hydrate or hydroxide; silicates; wax emulsions; and alumina. The preferred coagulating agent is alumina. The preferred coagulating agents are insoluble in both water and in the extraction agent which is used.

The solvent or extraction agent used in process step (ii) is preferably a solvent of the type also used in the original coatings, although it is not necessary for the solvent to be the same. Suitable solvents include ketones such as acetone, methylethylketone, methylisobutylketone, cyclopentanone and cyclohexanone; aromatic compounds such as benzene, toluene, xylene, chlorobenzene and nitrobenzene; ethers such as tetrahydrofuran, dioxan and butyl glycol; esters such as ethyl acetate, propyl acetate and butyl acetate; chlorinated hydrocarbons; and aprotic solvents such as dimethylformamide, dimethylacetamide and dimethylsulphoxide; and mixtures thereof.

Preferred solvents are those in which the organic coatings components are very soluble, but which are not themselves miscible with water, or are only miscible to a very limited extent. Examples of these solvents include butyl acetate and, in particular, aromatic hydrocarbons such as toluene or xylene.

The compounds having groups that are capable of reacting with isocyanate groups and are used in process step (iii) contain one isocyanate-reactive group which is more reactive with isocyanate groups than both water and the reactive components used in the two-component polyurethane coatings, i.e., preferably polyhydroxy compounds). Suitable mono-functional compounds are primary or secondary monoamines having aliphatically bound amino groups and a molecular weight of 31 to 283. Examples include methylamine, ethylamine, propylamine, butylamine, pentylamine, hexylamine, dimethylamine, diethylamine, dipropylamine, dibutylamine, dipentylamine, dihexylamine, diisopropylamine, stearylamine, N-methyl-stearylamine, cyclohexylamine, piperidine, pyrrolidine and morpholine. Higher molecular weight compounds, which possess a primary or secondary amine amino group and are otherwise substantially inert towards isocyanate groups, may also be used in process step (iii), although these higher molecular weight compounds are less preferred than the low molecular weight monoamines.

In the event that monoamines are used, especially the preferred monoamines, mixtures of binder components are produced in the process according to the invention which may be used as reactive components for organic polyisocyanates in two-component polyurethane coatings. In the event that very volatile monoamines are used, the resulting mixtures may also be used as stoving enamels. The monoamines are eliminated like blocking agents during the curing process.

A further group of compounds having groups capable of reacting with isocyanate groups, which may be used in process step (iii), are monofunctional blocking agents which are highly reactive towards isocyanate groups. These blocking agents preferably include lactams such as ε caprolactam and oximes such as acetone oxime, butanone oxime and cyclohexanone oxime. When blocking agents are used, the solutions or binder mixtures which are ultimately produced in the process according to the invention may be used stoving enamels. The stoving enamels may be either solvent-containing enamels or powder coatings.

A further, but less preferred, group of compounds which may be used in process step (iii) are aminoalcohols. These compounds are generally considered to be "monofunctional" when reacting with isocyanate groups due to the extremely different reactivities of amino and hydroxyl groups. This is especially true when the aminoalcohols are used in amount such that there is at least one amino group for every isocyanate group. Examples of aminoalcohols include 2-aminoethanol, 2-(methylamino)ethanol, diethanolamine, 3-amino-1-propanol, 1-amino-2-propanol, diisopropanolamine, 2-amino-2-methyl-propanol, 2-amino-2-methyl-1,3-propanediol, 2-amino-2-hydroxymethyl-1,3-propanediol and mixtures thereof.

When aminoalcohols are used, solutions or mixtures of organic polyhydroxyl compounds are ultimately produced which may be used again, for example, as the polyol component in two-component polyurethane coatings.

Compounds having groups capable of reacting with isocyanate groups which may be used in process step (iii), but which are also less preferred, are compounds which possess a further functional group, particularly a carboxylate or sulphonate group, apart from the group which is highly reactive towards isocyanate groups. Examples of these compounds include in particular the alkali salts of aminocarboxylic acids or aminosulphonic acids. When these compounds are used, reaction products are produced which are dispersible in water and which may be used as additives in aqueous coating systems.

Particularly preferred compounds having groups capable of reacting with isocyanate groups which may be used in process step (iii), are monoamines and oximes.

When performing the process according to the invention, water is used in a very large excess, relative to the coatings components being produced as "overspray." The coagulation agents are generally used in amounts of 10 to 1000% by weight, preferably 20 to 500% by weight, based on the weight of "overspray."

The amount of solvent is chosen to enable a good separation between the solid and liquid phases. Normally 50 to 500% by weight of solvent is used, based on the weight of the coatings slurry, which is made up of coagulation agent, adherent water and coatings components.

The amount of the component having groups capable of reacting with isocyanate groups which is used in process step (iii) is selected to provide 0.25 to 5, preferably 0.9 to 1.2, groups which are highly reactive towards isocyanate groups for each isocyanate group in the coatings component.

When performing the process according to the invention, the coatings components accumulating as "overspray" are washed out with water. At this time the water either already contains the coagulating agent in suspended form or the coagulating agent may be subsequently added to the mixture of water and coatings components. The resulting coatings slurry is separated by flotation or sedimentation and freed of the major part of the water by decantation.

The resulting concentrated coatings slurry is then mixed with solvent in process step (ii) and reacted with the compounds capable of reacting with isocyanate groups in process step (iii). The reaction generally takes place at a temperature of 0° to 150° C., preferably 15° to 80° C., and is continued until all of the isocyanate groups have reacted.

Finally, in the last process step any water which is still present is separated out (for example, by phase separation, distillation or azeotropic distillation) and solid components are separated from the solvent phase by filtration or decantation. The resulting solution contains the chemically modified coatings components which may be recycled. The solvent which is present may either form part of the mixture or it may be removed by distillation and optionally replaced by a different solvent.

To optimize the yield, it is also possible to extract the water separated out in accordance with process step (iv) and/or the solid material which is insoluble in organic solvents with a solvent which is inert towards isocyanate groups and to combine the resulting solvent phase with the major part of the solution obtained in accordance with process step (iv) to recover additional organic binder components.

In the following examples all parts and percentages are by weight unless otherwise indicated.

EXAMPLES

Example 1

1 kg of a coating was sprayed into a cubicle provided with a water separation unit. The coating was a 50% solids, solvent-containing, clear coating having a binder which contained a commercial polyacrylate polyol (Desmophen A 450, Bayer AG) having an OH content of 2.0%, based on solids, and trimerized hexamethylene diisocyanate (Desmodur N 3390, Bayer AG) having an NCO content of 19.4%. The coatings components were present at an NCO:OH equivalent ratio of 1:1. The coatings solvent was xylene. As an anti-gumming coagulating agent, Ipafloc, an alumina product made by IPA, was added to the cubicle water at a concentration of 0.4%. The mixture of cubicle water, Ipafloc and "overspray" was taken to a settling tank where it was mixed with 20%, relative to the "overspray", of Ipased, a commercial coagulating agent based on alumina and made by IPA. The "overspray" in this example was the total amount of coating used because no actual varnishing of a substrate took place. The purpose of this example was only to demonstrate the recycling of "overspray."

1 hour after finishing the spraying process the settled coatings slurry (2.5 kg) was removed and placed in a 5 l stirred container. 2.5 l of xylene and di-n-butylamine were added with stirring at room temperature. The amine was added in an amount sufficient to provide an NCO:NH equivalent ratio of 1:1. After 3 hours at room temperature the water was distilled off azeotropically and then the alumina was removed by filtration. The solution resulting as filtrate contained 85% of the coatings binder originally sprayed and was suitable for recycling.

After concentrating the binder solution to a solids content of 50%, it was mixed with trimerized hexamethylene diisocyanate in an amount sufficient to provide an equivalent ratio of isocyanate groups to hydroxyl groups of 1:1 and applied as a two-component polyurethane coating to a metal test sheet by spraying. After curing at room temperature, a clear, cross-linked, solvent-resistant coating was obtained.

Example 2

The binder solution of Example 1 was applied as a one-component polyurethane system and stoved for 30 minutes at 170° C. A clear, cross-linked, solvent-resistant coating was obtained.

Example 3

The settled coatings slurry of Example 1 was placed in a 5 l stirred container. 2.5 l of toluene and butanone oxime were added at room temperature. The oxime was added in an amount sufficient to provide an NCO:NH equivalent ratio of 1:1. After 5 hours the water was distilled off azeotropically and then the alumina was removed by filtration. After the addition of 2.5 g of tin(II) octanoate, the binder solution was processed in a spray dryer resulting in a powder coating.

The coating powder was applied to a metal test sheet and stoved for 30 minutes at 140° C. A clear, cross-linked, solvent-resistant coating was obtained.

Example 4

Example 1 was repeated with the exception that the polyol used was a commercial polyester polyol (Desmophen 670, Bayer AG) having an OH content of 4.3%, based on solids, and the coatings solvent was butyl acetate. 1 hour after finishing the spraying process the settled coatings slurry was removed and placed in a 5 l stirred container. 2.5 l of butyl acetate and methylstearylamine were added with stirring at room temperature. The amine was added in an amount sufficient to provide an NCO:NH equivalent ratio of 1:1. After 3 hours at room temperature the water was distilled off azeotropically and then the alumina was removed by filtration.

After concentrating the binder solution to a solids content of 50%, it was mixed with trimerized hexamethylene diisocyanate in an amount sufficient to provide an equivalent ratio of isocyanate groups to hydroxyl groups of 1:1 and applied as a two-component polyurethane coating to a metal test sheet by spraying. After curing at room temperature, a clear, cross-linked, solvent-resistant coating was obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for recovering and recycling the organic binder components accumulating during the spraying of a solvent-containing, two-component polyurethane coating or a solvent-containing, moisture-curing one-component polyurethane coating which comprises
   i) forming a coatings slurry containing the organic binder components, water and a coagulating agent,
   ii) mixing the coatings slurry, optionally after removing a portion of the water, with an organic solvent which is inert towards isocyanate groups,
   iii) reacting the free isocyanate groups present in the mixture obtained in step (ii) with a compound containing one isocyanate-reactive group which is more reactive with isocyanate groups than both water and the isocyanate-reactive component of the two-component polyurethane coating, if present, and
   iv) removing any remaining water and insoluble components from the organic phase accumulating in step (iii) and recovering the organic phase containing the organic binder components.

2. The process of claim 1 wherein said compound of step (iii) is an aliphatic primary or secondary monoamine having a molecular weight of 31 to 283.

3. The process of claim 1 wherein the organic binder Components recovered in step (iv) are used as the reaction partner for an organic polyisocyanate in a two-component polyurethane coating.

4. The process of claim 1 wherein said compound of step (iii) is a blocking agent for isocyanate groups.

5. The process of claim 1 wherein the organic binder components recovered in step (iv) are used as the binder in a one-component polyurethane coating which may be cross-linked at elevated temperature.

6. The process of claim 4 wherein the organic binder components recovered in step (iv) are used as the binder in a one-component polyurethane coating which may be cross-linked at elevated temperature.

7. The process of claim 1 which comprises removing the organic solvent from the organic phase recovered in step (iv) and using the organic binder components as the binder in a powder coating composition which may be cross-linked at elevated temperature.

8. The process of claim 4 which comprises removing the organic solvent from the organic phase recovered in step (iv) and using the organic binder components as the binder in a powder coating composition which may be cross-linked at elevated temperature.

9. The process of claim 1 which comprises treating the water separated and/or the solid material which was insoluble in the organic phase removed in step (iv) with an organic solvent which is inert towards isocyanate groups and combining the resulting solvent phase with the organic phase containing the organic binder components of step (iv) to recover additional organic binder components.

* * * * *